(12) United States Patent
Jeanneau

(10) Patent No.: US 9,044,657 B2
(45) Date of Patent: Jun. 2, 2015

(54) HOCKEY STICK BLADE

(75) Inventor: Philippe Jeanneau, Lachine (CA)

(73) Assignee: SPORT MASKA INC., Montreal, Quebec ( * ) Notice: Subject to any disclaimer, the term of this patent is extended or adjusted under 35 U.S.C. 154(b) by 253 days.

(21) Appl. No.: 13/341,894

(22) Filed: Dec. 30, 2011

(65) Prior Publication Data
US 2013/0172135 A1 Jul. 4, 2013

(51) Int. Cl.
*B29C 70/30* (2006.01)
*B29C 70/44* (2006.01)
*A63B 59/00* (2006.01)
A63B 59/14 (2006.01)
B29L 31/52 (2006.01)

(52) U.S. Cl.
CPC .............. *A63B 59/14* (2013.01); *B29C 70/44* (2013.01); *A63B 59/0088* (2013.01); *A63B 2209/02* (2013.01); *B29L 2031/52* (2013.01)

(58) Field of Classification Search
CPC ........ A63B 59/14; B29C 70/30; B29C 70/44; B29C 2043/3649
USPC .......................................... 264/314
See application file for complete search history.

(56) References Cited

U.S. PATENT DOCUMENTS

| | | | |
|---|---|---|---|
| 3,270,111 A * | 8/1966 | Haldemann .................... 264/231 |
| 3,493,240 A * | 2/1970 | Jenks ............................ 280/610 |
| 3,641,230 A * | 2/1972 | Jenks ............................ 264/152 |
| 4,488,721 A * | 12/1984 | Franck et al. ................. 473/563 |
| 4,511,523 A * | 4/1985 | Hsu .............................. 264/46.6 |
| 4,828,781 A * | 5/1989 | Duplessis et al. ............. 264/250 |
| 5,407,195 A | 4/1995 | Tiitola et al. |
| 5,417,418 A * | 5/1995 | Terzaghi et al. .............. 473/535 |
| 5,624,519 A * | 4/1997 | Nelson et al. ................. 156/245 |
| 5,848,800 A * | 12/1998 | Metzler et al. ................ 280/610 |
| 5,853,651 A * | 12/1998 | Lindsay et al. ............... 264/512 |
| 5,935,029 A | 8/1999 | Cyr et al. |
| 6,824,636 B2 * | 11/2004 | Nelson et al. ................. 156/189 |
| 7,150,692 B2 | 12/2006 | Hong |
| 7,326,136 B2 | 2/2008 | Jean et al. |
| 7,914,403 B2 | 3/2011 | Ie |
| 7,963,868 B2 | 6/2011 | McGrath et al. |
| 2003/0004019 A1 | 1/2003 | Lussier et al. |
| 2003/0119612 A1* | 6/2003 | Goldsmith et al. ........... 473/560 |
| 2005/0181897 A1 | 8/2005 | Chen et al. |
| 2005/0258575 A1* | 11/2005 | Kruse et al. ................... 264/512 |
| 2006/0089215 A1 | 4/2006 | Jean et al. |
| 2010/0035708 A1 | 2/2010 | Ie |
| 2011/0160009 A1 | 6/2011 | Le |

FOREIGN PATENT DOCUMENTS

| | | |
|---|---|---|
| CA | 2062635 | 9/1993 |
| WO | 2006042422 A1 | 4/2006 |
| WO | 2010017421 A1 | 2/2010 |

* cited by examiner

*Primary Examiner* — Matthew Daniels
(74) *Attorney, Agent, or Firm* — Norton Rose Fulbright Canada

(57) ABSTRACT

A hockey stick blade comprising an elongated fiber-reinforced polymer body having a fiber-reinforced polymer front face element and a fiber-reinforced polymer rear face element. The rear face element is spaced apart from the front face element. The blade also comprises a plurality of elongated longitudinal cavities within the body between the front face element and the rear face element. The longitudinal cavities have curved ends in transverse cross-section. The longitudinal cavities define at least one fiber-reinforced polymer structural member interconnecting the front face element and the rear face element. The at least one structural element is biconcave in transverse cross-section. The hockey stick blade has a neck, a heel and a toe. A method of bladder molding a hockey stick blade is also disclosed.

8 Claims, 11 Drawing Sheets

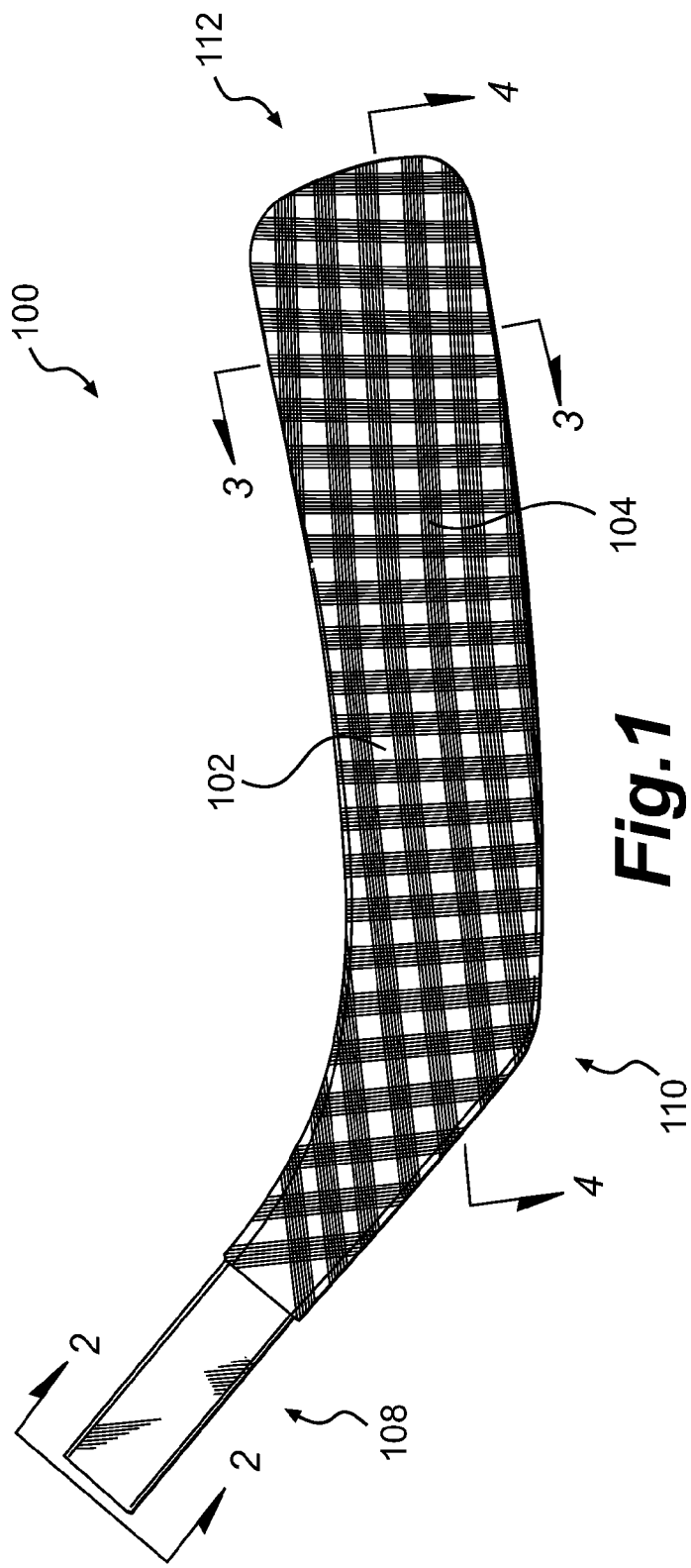
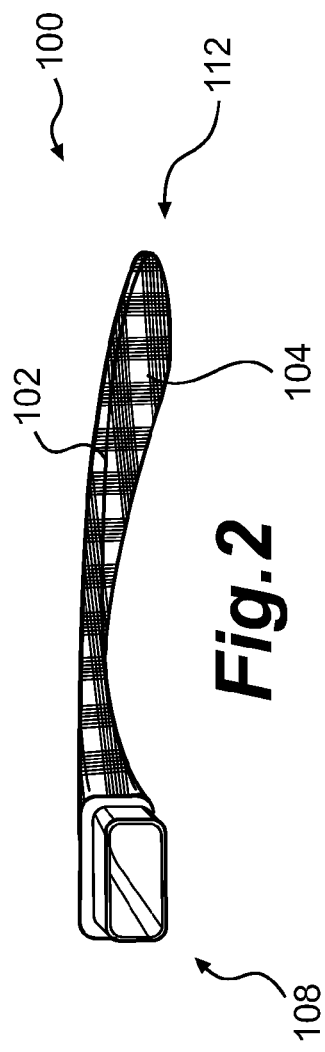

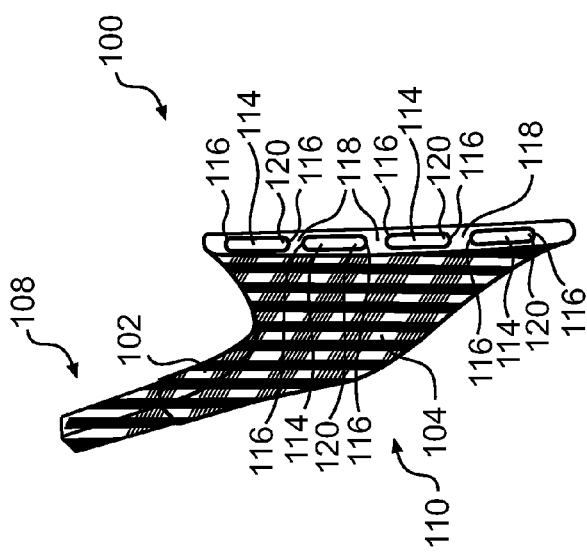
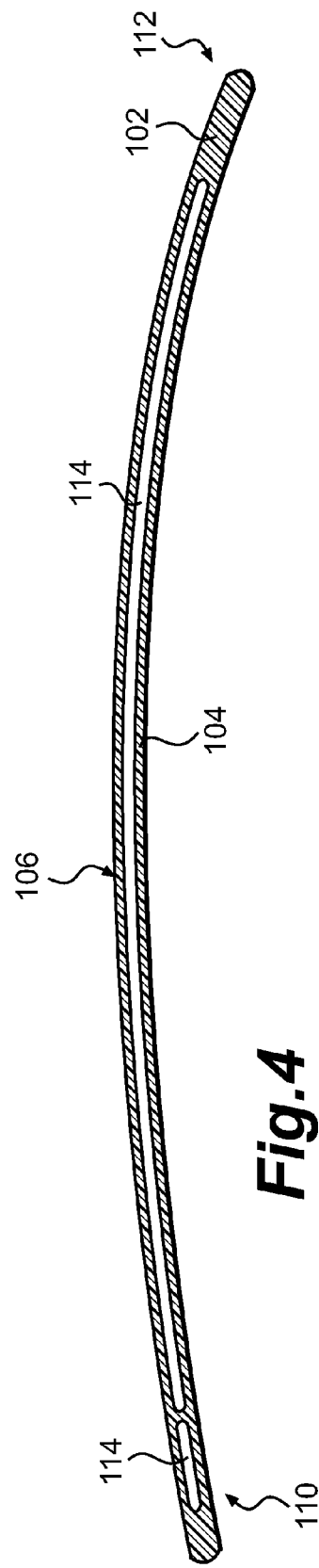
Fig.3
Fig.4

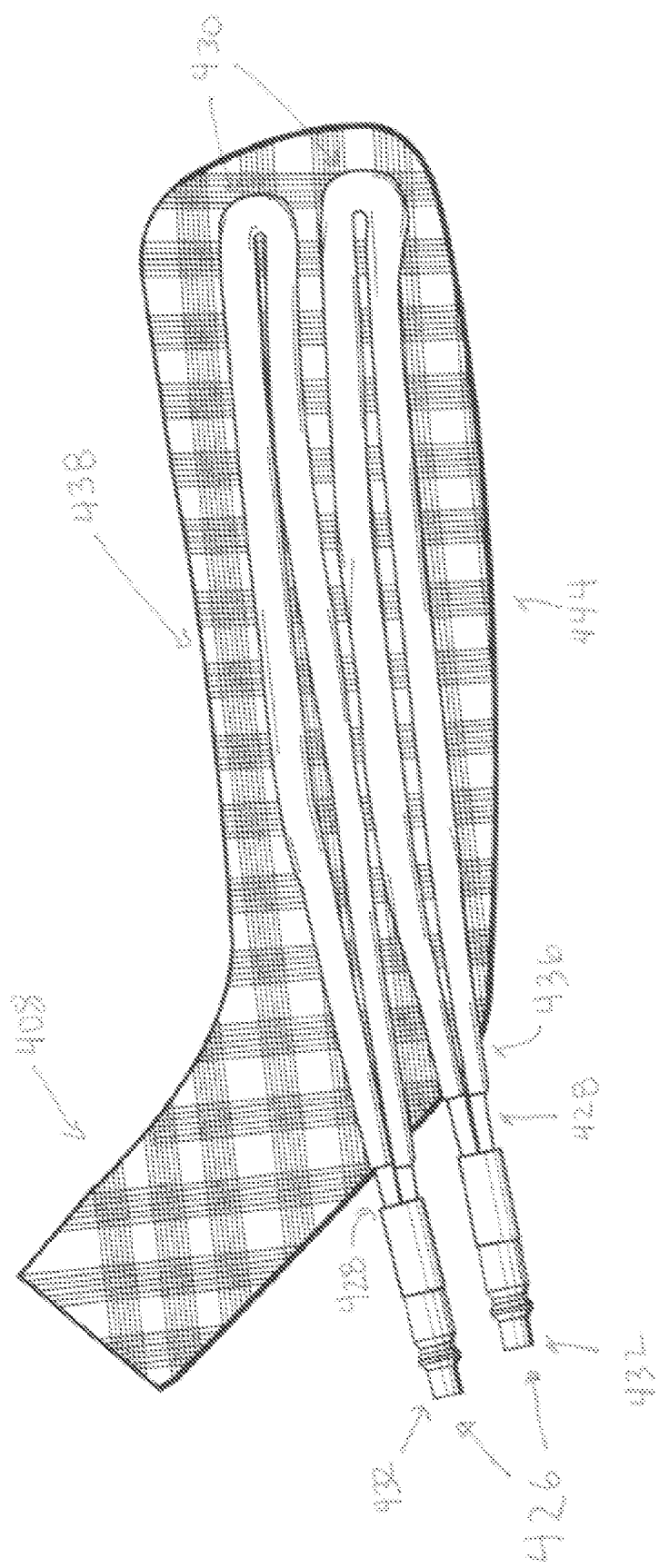

HOCKEY STICK BLADE

FIELD

The present invention relates to a hockey stick blade, and to hockey sticks having such blade.

BACKGROUND

Conventional hockey sticks, such as those used in playing ice or street hockey, have a shaft and an adjoining blade. The shaft has a handle (being the portion that a typical player grasps during most of the course of normal use of the stick during game play) and a shank (being the portion extending below the handle to the connection point with the neck of the blade). The handle is generally rectangular usually with chamfered, bevelled or rounded corners (as the case may be—depending usually on the material of which the shaft is made and the method of its construction). The longer sides of the rectangle are those which form part of the front and rear faces of the shaft (the front face of the shaft being that face which faces in generally the same direction as the striking surface of the blade; the rear face being the face opposite the front face). The shank is also generally rectangular, however, its corners are not usually chamfered, bevelled nor rounded; or if they are, only slightly so. The shank tapers in width (between the front face and rear face) from the handle down the shaft towards the point to which the blade is attached. The shank does not usually taper in width between the left face and the right face of the shaft (the faces formed by the shorter two sides of the rectangle). The blade has a body having a striking surface and a neck extending upwards from the body that connects to the shank of the shaft. The general size and shape of hockey sticks has been relatively constant for some time.

The materials of construction of hockey sticks, however, have changed over the course of time. For example, at various times ice hockey sticks have been made having shafts of solid wood, laminated wood, fiberglass-reinforced-polymer-coated wood, fiberglass-reinforced polymers, aluminum, titanium, and carbon-fiber-reinforced polymers. Similarly, at various times hockey stick blades have been commonly made of different materials including wood and carbon-fiber-reinforced polymers. Current conventional sticks include one piece sticks having both a shaft and a blade made of a carbon-fiber-reinforced polymer, the shaft typically being hollow, and the blade being solid or foam filled.

The blade of a hockey stick should be relatively strong in order for it to endure the forces developed between it and a puck and/or the playing surface. On the other hand, the blade should have a certain amount of flexibility so that the player has an acceptable level of "feel" while handling a puck or executing a shot. With the shift from wood to fiber-reinforced polymer (also known as "composite") blades, there have come advances in blade design. In this respect, it is advantageous to have composite blade constructions for hockey stick blades that are strong, durable, lightweight and of an acceptable stiffness.

One example of a fiber-reinforced blade design can be found in U.S. Pat. No. 5,407,195. The drawback with some conventional fiber-reinforced polymer blade designs tends to be that the blades (and sticks) do not last as long as wooden blades did in the past. Improvements in the life, strength, and/or performance of such blades would nonetheless be appreciated by those using hockey these types of hockey sticks and blades.

SUMMARY

It is an object of the present invention to provide an improved hockey stick blade, at least as compared with some of the prior art.

Thus, in one aspect, as embodied and broadly described herein, the present invention provides a hockey stick blade. The hockey stick blade comprises an elongated fiber-reinforced polymer body having a fiber-reinforced polymer front face element and a fiber-reinforced polymer rear face element. The rear face element is spaced apart from the front face element. The hockey stick blade also comprises a plurality of elongated longitudinal cavities within the body between the front face element and the rear face element. The longitudinal cavities define at least one fiber-reinforced polymer structural member interconnecting the front face element and the rear face element. The at least one structural element is biconcave in transverse cross-section. At least two of the longitudinal cavities are connected to each other at ends thereof. The hockey stick blade has a neck, a heel and a toe.

In many embodiments, the blade is made of superposed layers of carbon fiber reinforced fabric in an epoxy resin matrix. In different embodiments, the various superposed layers of fiber reinforced material can include carbon fiber, glass fiber, para-aramid synthetic fiber, polypropylene fiber, boron fiber, or a combination thereof. Such layers of fiber reinforced material can include woven or nonwoven layers of fibers or combinations thereof. It is contemplated that in various embodiments, the fibers can be in the form of continuous fibers or discontinuous fibers and can be aligned, patterned, or randomly oriented. In some embodiments, the fiber reinforced material can include a thermoset or thermoplastic resin matrix. The fiber reinforced material can include different types of resins, such as, for example, a two-part epoxy resin, a polyester resin, a urethane resin, or a combination thereof. Structures such as those described in U.S. patent application Ser. No. 13/072,287 (incorporated by reference herein in its entirety) are also contemplated.

Without wishing to be bound be any particular theory, it may be that, at least in some embodiments, the fiber-reinforced polymer structural members interconnecting the front face element and the rear face element being bi-concave in transverse cross-section renders these elements stronger and more likely to withstand the forces to which the blade will be subjected during game play. Thus blades of such a construction may have a (relatively) longer life than blades of similar construction having structure members being rectangular in cross-section (such as those shown in the aforementioned U.S. Pat. No. 5,407,195). In some embodiments, it may be possible to more easily and more cost effectively manufacture hockey blades having bi-concave fiber-reinforced polymer structural members interconnecting the front face element and the rear face element as compared to manufacture of known blades with rectangular structures.

The longitudinal cavities have curved ends in transverse cross-section. In some embodiments, each of the longitudinal cavities has a generally oblong circle shape in cross-section. In other embodiments, each of the longitudinal cavities is generally "pill-shaped" in transverse cross-section. (In the present context, "pill-shaped" should be understood as having two straight generally parallel sides with rounded ends.) In other embodiments the longitudinal cavities are circular, elliptical, oval or irregular in transverse cross-section. It is not required that all of the longitudinal cavities have the same shape in transverse cross-section. This may be the case in some embodiments, and not in others.

Similarly, it is not required that that all of the longitudinal cavities have the same size in transverse cross-section. This may be the case in some embodiments, and not in others. The longitudinal cavities (nor any particular one of them) need not be of any particular size.

Similarly, it is not required that the spacing between the longitudinal cavities be equidistant. This may be the case in some embodiments and not in others. No particular spacing between the longitudinal cavities is required.

In some embodiments the front face element, the rear face element, and each of the structural members interconnecting the front face element and the rear face element are a single unitary structure. In other embodiments, the front face element, the rear face element and/or the structural members interconnecting the front face element and the rear face element are fabricated as separate structures that are later joined together.

The longitudinal cavities need be of no particular size, shape nor spacing in longitudinal cross-section. In some embodiments the longitudinal cavities extend within the neck of the blade. In other embodiments the longitudinal cavities do not extend with the neck of the blade. In some embodiments the longitudinal cavities extend an entire longitudinal length of the blade. In other embodiments the longitudinal cavities do not extend an entire longitudinal length of the blade. In some embodiments the longitudinal cavities extend solely with a central portion of the blade.

In some embodiments the longitudinal cavities are cavities left over after removal of bladders having been used during a bladder molding operation during formation of the hockey stick blade.

In some embodiments the front face element and/or the rear face element include at least one material (e.g., the fibers and/or the polymer) different from a material of the structural members interconnecting the front face element and the rear face element. This may be the case, for instance, where the bladders used to form the blades via a bladder molding process are individually wrapped with one pre-preg composite material and are collectively wrapped with a different pre-preg composite material. (This process is described in further detail below.)

In some embodiments two of the longitudinal cavities are connected at ends thereof via a U-shaped cavity. It should be understood however that none, some, or all of the cavities may be connected together. Where there is a connection between the cavities, no particular type of connection is required.

In some embodiments the least one fiber-reinforced polymer structural member interconnecting the front face element and the rear face element is at least three fiber-reinforced structural members interconnecting the front face element and the rear face element. It should be understood however that no particular number of longitudinal cavities is required.

In some embodiments at least some of the cavities are filled. It is anticipated that in some such embodiments the cavities contain ambient pressure air, while in other embodiments the cavities could be filled with gases (at ambient, lower than ambient, or higher than ambient pressure), liquids, gels and/or solids (or some combination thereof) to change the physical properties (e.g., mass, mass distribution) of the blade. Where the cavities are filled, it is not required that they each be filled with the same material.

In another aspect, as embodied and broadly described herein, the present invention also provides a hockey stick blade. The hockey stick blade comprises a bladder-molded elongated fiber-reinforced polymer body having a neck, a heel and a toe. The hockey stick blade also includes a fiber-reinforced polymer front face element and a fiber-reinforced polymer rear face element. The rear face element is spaced apart from the front face element. The hockey stick blade also includes at least one fiber-reinforced polymer structural member interconnecting the front face element and the rear face element and extending longitudinally within the blade. The at least one fiber-reinforced polymer structural member and the front and rear face elements define a plurality of elongated longitudinal cavities within the body.

In some embodiments the front face element, the rear face element, and each of the structural members interconnecting the front face element and the rear face element are a single unitary structure.

In some embodiments at least two of the longitudinal cavities are connected to each other at ends thereof.

In some embodiments, the plurality of elongated longitudinal cavities are further defined by an air bladder proximate to the at least one fiber-reinforced polymer structural member and the front and rear face elements. (In some embodiments, the bladder used during bladder molding is left in the finished product. In such an instance, the cavity is bounded by the bladder left inside.)

In another aspect, as embodied and broadly described herein, the present invention also provides a hockey stick. The hockey stick comprises a hockey stick shaft having a proximal end and a distal end. The hockey stick shaft also comprises a hockey stick blade as recited hereinabove. The neck of the blade adjoins the distal end of the hockey stick shaft. In some embodiments the hockey stick shaft and the hockey stick blade are fabricated as a single unitary structure. In other embodiments the hockey stick shaft and the hockey stick blade are fabricated as separate structures and are subsequently affixed together to form a hockey stick. In other case, it is not necessary that the hockey stick shaft and the hockey stick blade be manufactured of the same material(s) (although this will likely be the case).

In still another aspect, as embodied and broadly described herein, the present invention also provides a method of fabricating a hockey stick blade. The method comprises:

wrapping at least one inflatable bladder with at least one pre-preg composite element;

placing at least one wrapped inflatable bladder within a mold having a general form of a hockey stick blade;

inflating the at least one wrapped inflatable bladder within the mold; and heating the mold to cure the at least one pre-preg composite element and form a cured hockey blade structure.

In some embodiments, the method of fabricating a hockey stick blade as described hereinabove further comprises removing the cured hockey blade structure from the mold.

In some embodiments, the method of fabricating a hockey stick blade as described hereinabove further comprises deflating the at least one inflatable bladder and removing at least a portion of the at least one inflatable bladder from the cured hockey blade structure.

In some embodiments, the method of fabricating a hockey stick blade as described hereinabove further comprises sealing any openings in the hockey stick blade structure from which the at least one inflatable bladder was removed.

In some embodiments, the method of fabricating a hockey stick blade as described hereinabove further comprises severing the at least one inflatable bladder at a point outside of the hockey stick blade structure. In some of such embodiments, the at least one inflatable bladder is not removed from the finished hockey stick blade. In some such embodiments, the bladders contain ambient pressure air, while in other embodiments the bladders could be filled with gases (at ambient, lower than ambient, or higher than ambient pressure), liquids, gels and/or solids (or some combination thereof) and then sealed. Where the bladders are filled, it is not required that they each be filled with the same material.

In some embodiments, the method of fabricating a hockey stick blade as described hereinabove further comprises combining the cured hockey blade structure with additional cured fiber-reinforced polymer structure to form the hockey stick blade. In some of such embodiments, the additional cured fiber-reinforced polymer structure is a hockey stick blade toe cap or a heel cap.

In some embodiments, wrapping at least one inflatable bladder with at least one pre-preg composite element is individually wrapping a plurality of inflatable bladders with at least one pre-preg composite element per bladder; and the method of fabricating a hockey stick blade further comprises collectively wrapping the plurality of inflatable bladders together with at least one pre-preg composite element.

In some embodiments, the method of fabricating a hockey stick blade as described hereinabove further comprises the step of arranging the wrapped inflatable bladder in a U-shape within the mold. In other embodiments, the method further comprises arranging the wrapped inflatable bladder in a U-shape and then wrapping the U-shaped inflatable bladder with at least one additional pre-preg composite element prior to placing the at least one wrapped inflatable bladder within the mold.

In some embodiments, when a U-shaped inflatable bladder is used to make a hockey stick blade, the inflatable bladder may pinch at the point that the inflatable bladder bends to form the U-shape. In such instances, it may be difficult to fully inflate the bladder during bladder molding. Thus, in some embodiments, an air flow enabler is installed within the bladder prior to molding. Examples of air flow enablers include, but are not limited to, thread, string, wire, hose, a porous structure (e.g., foam or a screen), or a combination thereof inserted into the bladder at least in the area of the bend or potential air obstruction. In other embodiments, a structural elbow (e.g., a rigid elbow such as a thermoplastic polyurethane elbow) or a bladder wall reinforcement could be installed at the bend to facilitate air flow.

As would be understood by a person skilled in the art, the term "pre-preg" in the present context is a term for "pre-impregnated" composite fibers used in the manufacture a fiber-reinforced polymer containing article. Pre-preg materials usually take the form of a fiber (whether a weave or uni-directional) bound together by an amount of matrix material in a malleable (usually partially cured) form.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 1 is a front elevation view of a hockey stick blade being an embodiment of the present invention.

FIG. 2 is a top plan view of the hockey stick blade of FIG. 1.

FIG. 3 is a cross-section of the hockey stick blade of FIG. 1 taken along the line 3-3 in FIG. 1.

FIG. 4 is a cross-section of the hockey stick blade of FIG. 1 taken along the line 4-4 in FIG. 1.

FIG. 14 is a top plan view of an inflatable bladder apparatus with bladders having been individually wrapped with pre-preg composite elements and an additional pre-preg composite element for collectively wrapping the previously individually wrapped bladders; the hockey stick blade formed through the use thereof being another embodiment of the present invention.

DETAILED DESCRIPTION

Figure 5:
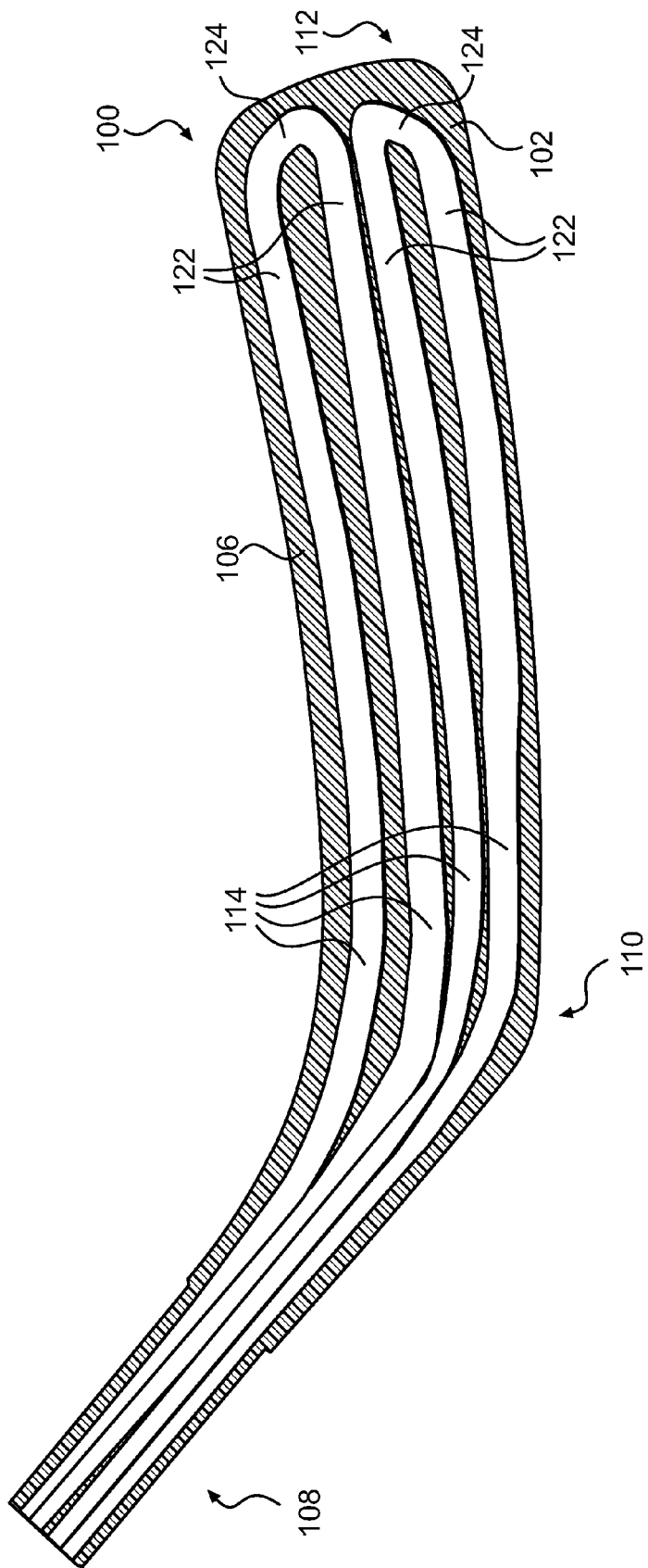
FIG. 5 is a longitudinal cross-section of the hockey stick blade of FIG. 1.

Referring to FIGS. 1 to 5, there is shown an ice hockey stick blade 100, being an embodiment of the present invention. The blade 100 has an elongated fiber-reinforced polymer body 102. The body 102 of the blade 100 has a fiber-reinforced polymer front face element 104 and a fiber-reinforced polymer rear face element 106. The rear face element 106 is spaced apart from the front face element 104. The blade 100 also has a neck 108, a heel 110, and a toe 112.

Within the body 102 of the blade 100, there are a plurality (in this embodiment, four) longitudinal cavities 114 between the front face element 104 and the rear face element 106. As can best been seen in FIG. 3, the longitudinal cavities 114 are generally oblong circular shaped or pill-shaped and have curved ends 116 in transverse cross-section. (This shape is created via the bladder molding process described hereinbelow.) A plurality (in this embodiment, three) fiber-reinforced polymer structural members 118 interconnect the front face element 104 and the rear face element 106. Each of the structural members 118 is biconcave (i.e., has two concave faces 120) in transverse cross-section.

As can best be seen in FIG. 5, in this embodiment the longitudinal cavities 114 extend the entire longitudinal length of the blade 100 and extend within the neck 108 of the blade 100. The longitudinal cavities 114 are also connected together in pairs of twos at their toe ends 122 by U-shaped cavities 124. In this embodiment, the longitudinal cavities 114 contain ambient pressure air. It can also be seen in FIG. 5, that the structural members 118 extend longitudinally within the body 102 of the blade.

The blade 100 is formed via a bladder molding process. As can best be seen in FIG. 8, the bladder molding process requires a bladder molding apparatus 126. In the present embodiment two bladder molding apparatuses 126 are used together to form the blade 100. Each bladder molding apparatus 126 has an elongated inflatable bladder 128 with a U-shape 130 at one end thereof and a nozzle 132 at the other end thereof.

Figure 6:
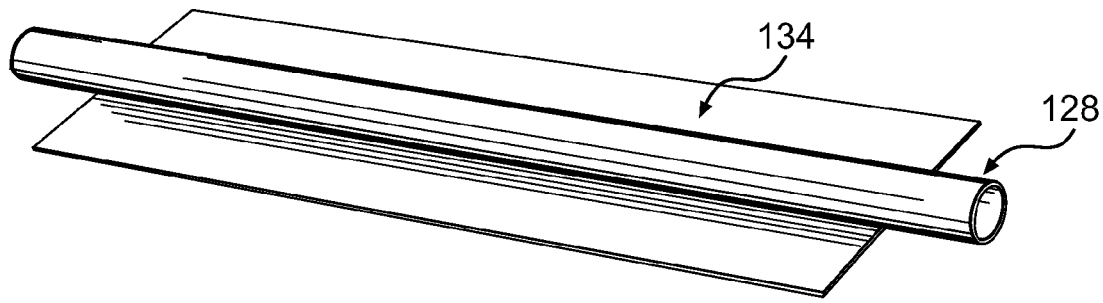
FIG. 6 is a perspective view of a portion of an inflatable bladder and a pre-preg composite element before the pre-preg composite element has been wrapped around the bladder.
Figure 7:
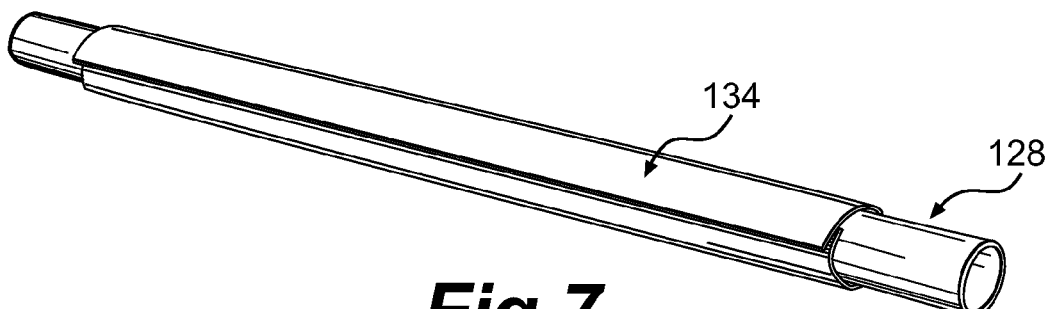
FIG. 7 is a perspective view of the portion of the inflatable bladder and the pre-preg composite element of FIG. 6 with the pre-preg composite element having been wrapped around the bladder.
Figure 8:
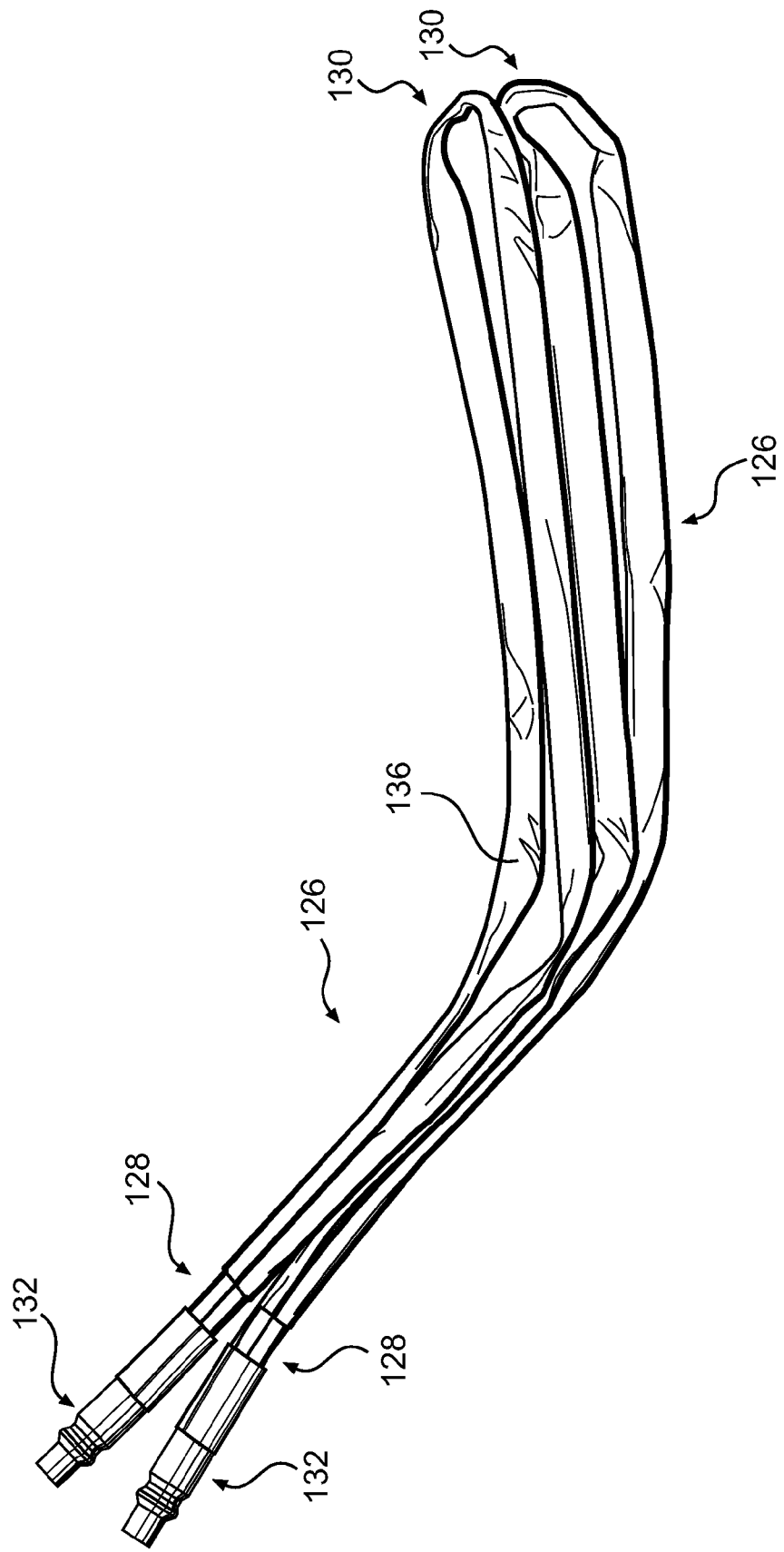
FIG. 8 is a top plan view of a bladder apparatus (with individually wrapped bladders) for use in bladder molding a hockey stick blade being an embodiment of the present invention.

Referring to FIGS. 6-8, to use a bladder molding apparatus 126, portions of the bladders 128 are wrapped with a pre-preg composite material element (shown prior to wrapping as element 134 in FIG. 6 and after having been wrapped as element 136 in FIGS. 7 and 8.) It should be understood that the Figures are generally schematic and in most embodiments many (relatively) smaller elements 134 are used to wrap a bladder 128 rather than a large single element.

Figure 9:
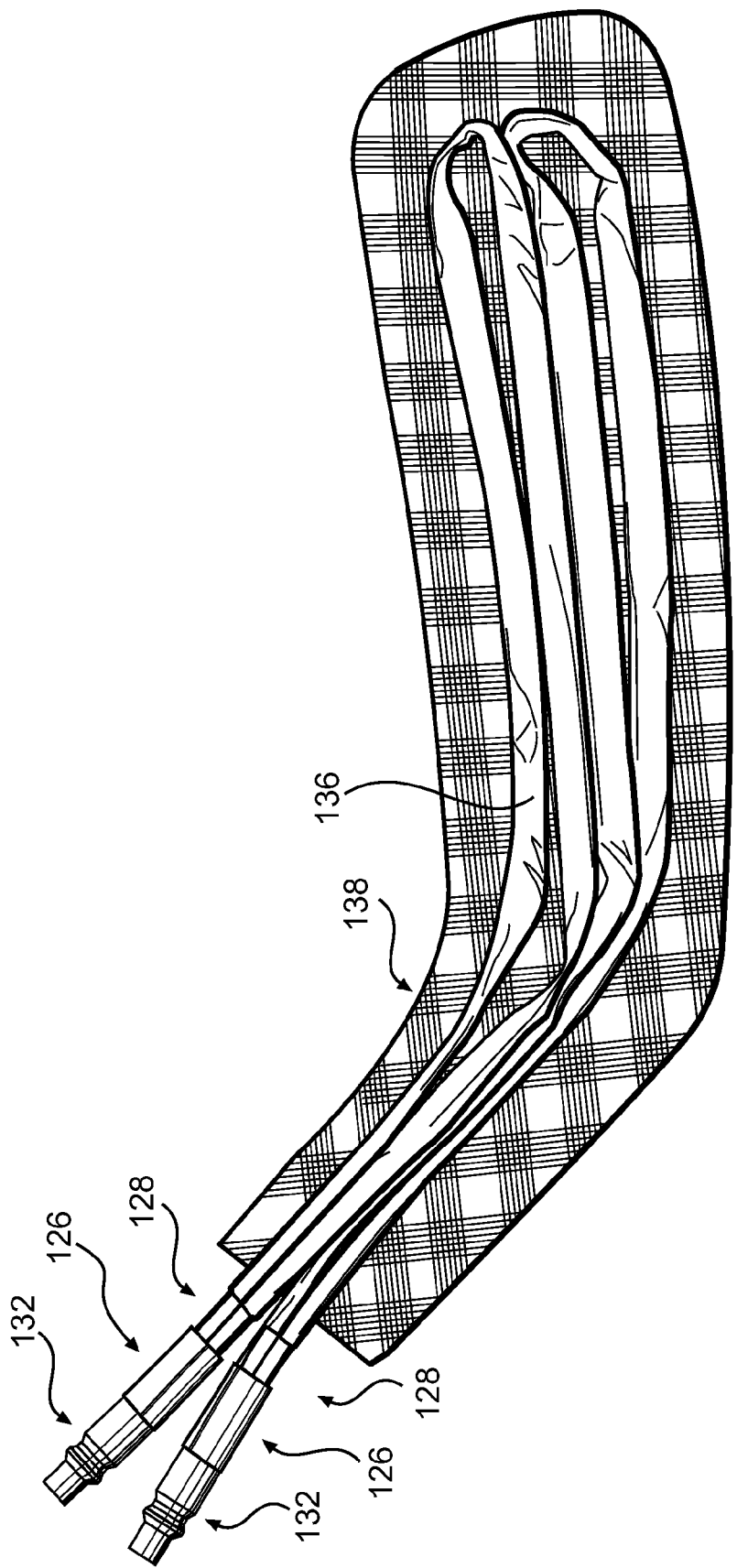
FIG. 9 is a top plan view of the bladder apparatus of FIG. 8 and an additional pre-preg composite element for collecting wrapping the previously individually bladders of the bladder apparatus.
Figure 10:
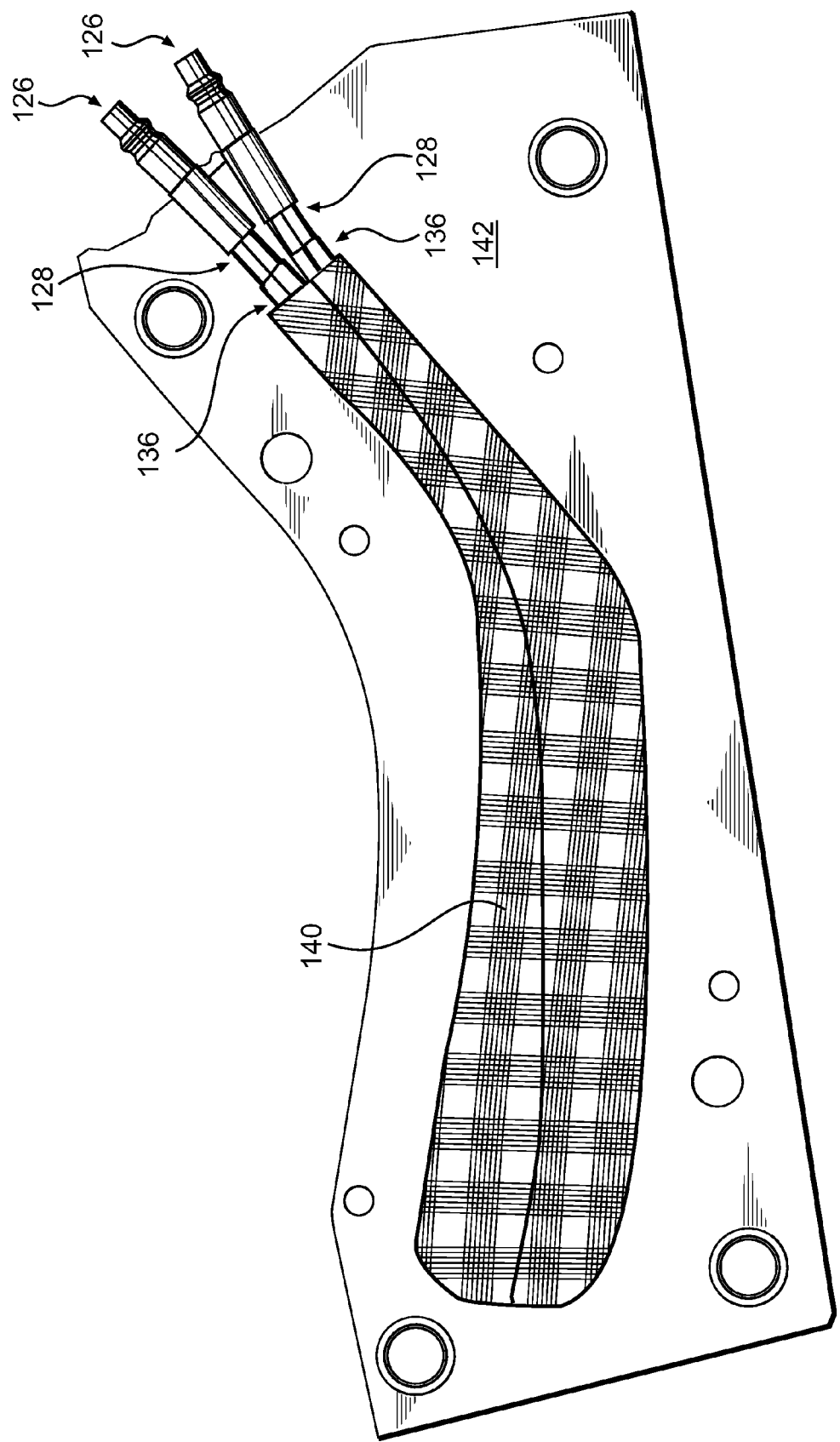
FIG. 10 is a top plan view of the bladder apparatus and additional pre-preg composite element of FIG. 9, with the additional pre-preg composite element having been collectively wrapped around the bladders and with the bladder apparatus having been placed into a mold for curing the pre-preg composite elements.

Referring to FIG. 9, once the individual bladders 128 of each bladder apparatus 126 are individually wrapped, the bladder apparatuses 126 are then placed side by side and aligned on an additional pre-preg composite material element 138. The additional pre-preg composite material element 138 is then wrapped collectively around all of the individually wrapped bladders 128 of each of the bladder apparatuses 126. Additional layers of pre-preg composite elements can also be placed about the wrapped bladder apparatuses 126 to provide desired properties of the finished blade. Any of the various techniques known in the art for layering various sized, shaped, and thickness pre-preg materials on a hockey stick blade can be used. The resulting double-bladder-apparatus (shown as 140 in FIG. 10) is placed in a mold 142 having the ultimate desired form of the blade 100 (see FIG. 10). (In the Figures the criss-cross pattern on the additional pre-preg composite material element 138 is present for ease of viewing to distinguish it from the elements 136. The criss-cross pattern thus does not indicate any particular structure.)

The bladder molding apparatuses 126 are oriented with respect to the additional pre-preg composite material element 138 and the mold 142 in such a way that the bladders extend the complete longitudinal length of the blade 100 to be formed, as well as through the neck 108 of the blade to be formed. The nozzles 132 extend out the neck 108 of the blade 100 to be formed.

Figure 11:
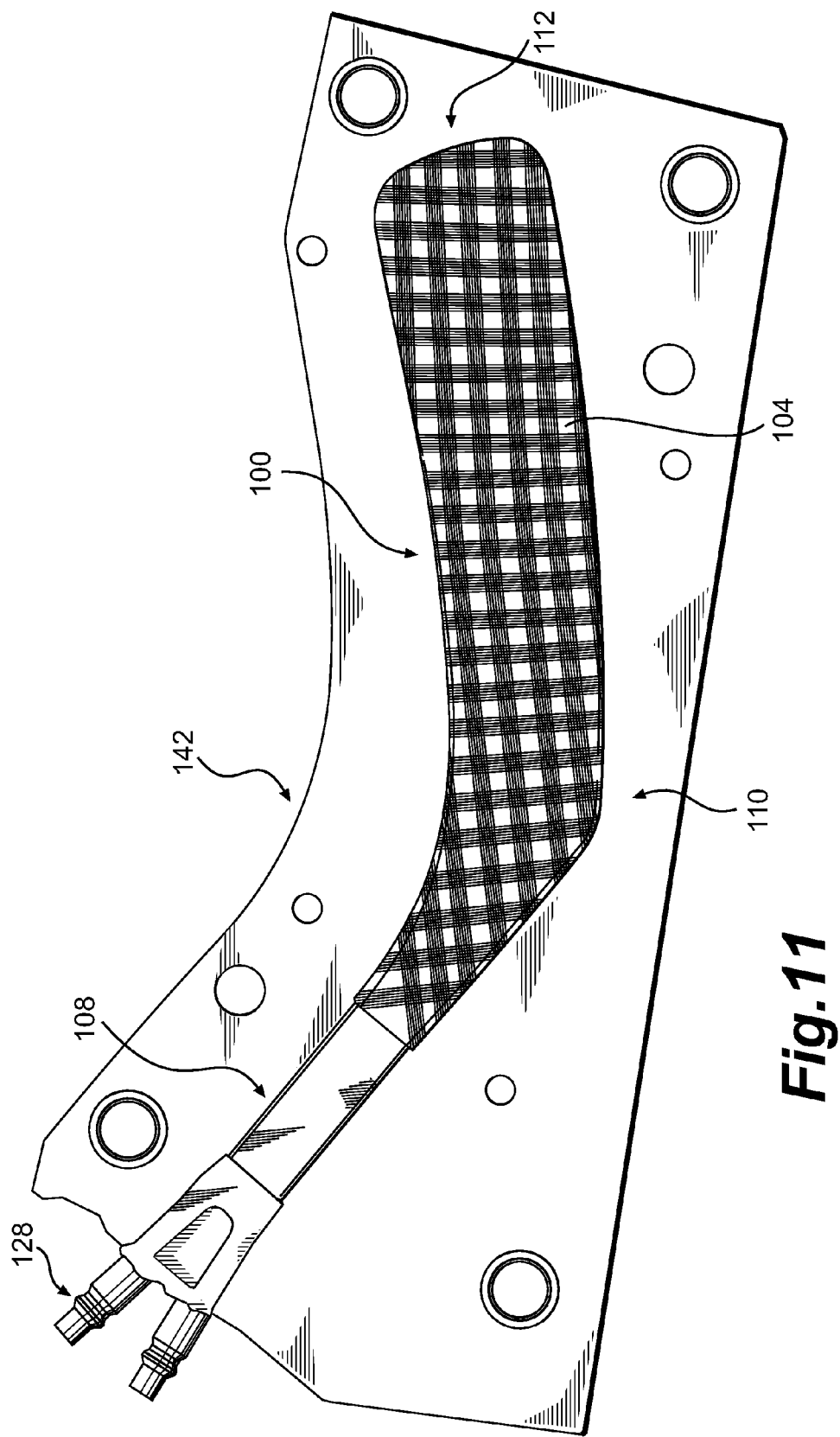
FIG. 11 is a top plan view of a cured hockey stick blade structure before removal from the mold.

The mating portion of the mold (not shown) is then placed on the mold 142 and the bladders 128 are inflated via injection of air through the nozzles 132. The mold 142 is heated to cure the pre-preg composite material into a final fiber-reinforced polymer forming the hockey stick blade (structure) 100, best seen in FIG. 11. The bladders are deflated and the mold 142 is allowed to cool. In some embodiments, the bladders are at least partially removed from the interior of the (now cured) hockey stick blade 100. Cavities 114 have been formed in the body 102 of the blade 100 where the bladders 128 were during the curing process. By the blade 100 having been formed in this manner, in this embodiment, the front face element 104 of the blade 100, the rear face element 106 of the blade 100 and the structural members 118 of the blade 100 are all one single unitary structure. The neck 108 of the blade 100 can be attached to the proximal end of a hockey stick shaft (not shown) in a conventional manner.

Figure 12:
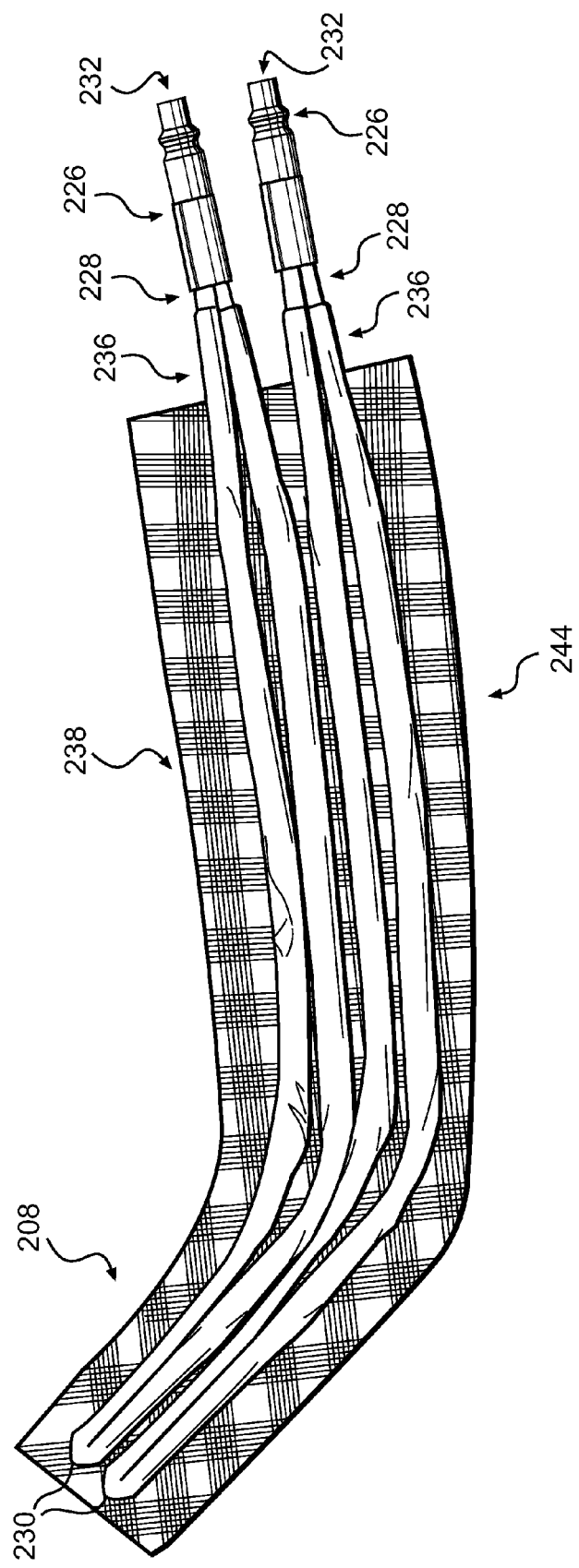
FIG. 12 is a top plan view of an inflatable bladder apparatus with bladders having been individually wrapped with pre-preg composite elements and an additional pre-preg composite element for collectively wrapping the previously individually wrapped bladders; the hockey stick blade formed through the use thereof being another embodiment of the present invention.

FIG. 12 shows a method of fabrication of a hockey blade (final blade not shown) being another embodiment of the invention, via a similar bladder molding process. In this process, the bladder molding apparatuses 226 are oriented with respect to the additional pre-preg composite material element 238 and with respect to the mold (not shown) in such a way that the bladders 228 extend almost the complete longitudinal length of central portion 244 the blade to be formed, as well as through the neck 108 of the blade to be formed. In this embodiment, however, the nozzles 232 extend from the toe end of the blade to be formed, and the U-shaped ends 230 of the bladders 228 are in the neck of the blade to be formed. Thus, after the hockey blade structure has been formed via this method and the bladders 228 have been removed, it will be required to seal the holes left after their removal. This may be done, for example, by adding additional pre-preg material at the toe end of the hockey blade structure, inserting the structure in an appropriate mold and curing the additional pre-preg material. The final blade has cavities that extend almost the entire central portion 244 of the blade and through the neck 208 of the blade.

Figure 13:
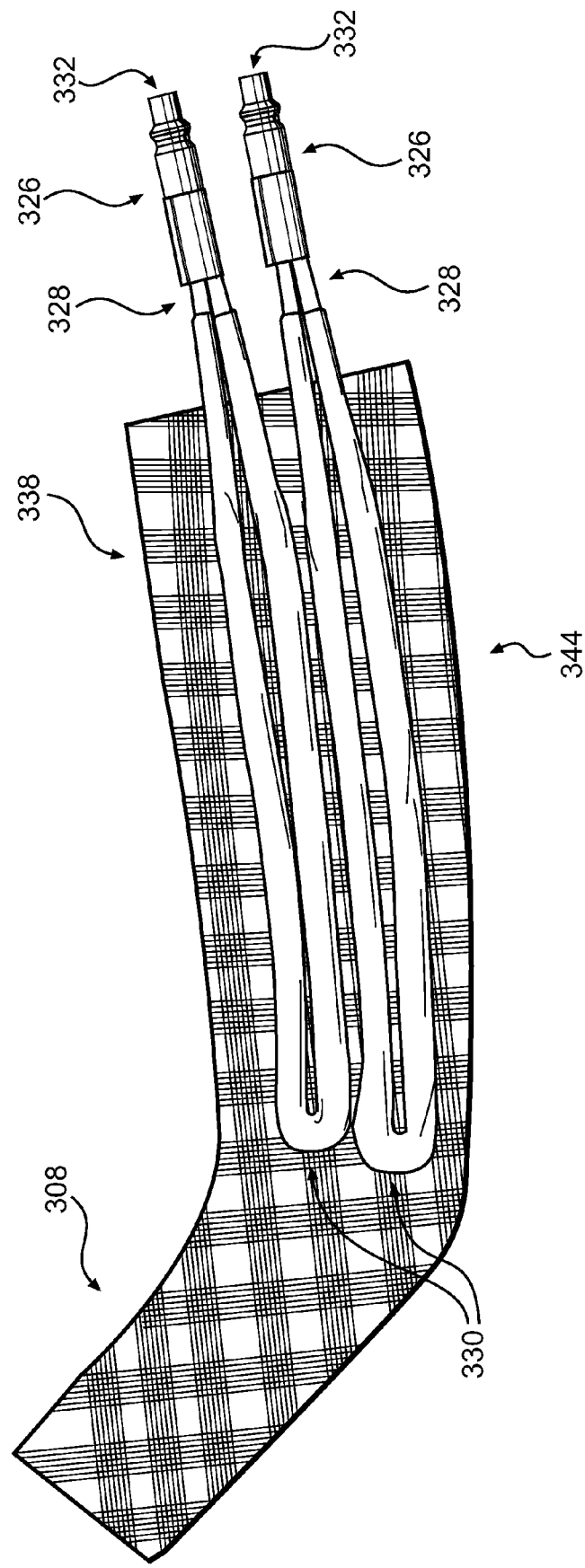
FIG. 13 is a top plan view of an inflatable bladder apparatus with bladders having been individually wrapped with pre-preg composite elements and an additional pre-preg composite element for collectively wrapping the previously individually wrapped bladders; the hockey stick blade formed through the use thereof being another embodiment of the present invention.

FIG. 13 shows a method of fabrication of a hockey blade (final blade not shown) being another embodiment of the invention, via a similar bladder molding process as is shown in FIG. 12. In this process, the bladder molding apparatuses 326 are oriented with respect to the additional pre-preg composite material element 338 and with respect to the mold (not shown) in such a way that the bladders 328 extend almost the complete longitudinal length of the central portion 344 blade to be formed, but not through the neck 308 of the blade to be formed. The U-shaped ends 330 of the bladders 328 remain within the central portion 344 of the blade to be formed. Again in this embodiment, the nozzles 332 extend from the toe end of the blade to be formed. Thus as was the case with the embodiment in FIG. 12, after the hockey blade structure has been formed via this method and the bladders 328 have been removed, it will be required to seal the holes left after their removal. The final blade has cavities that extend almost the entire central portion 244 of the blade but not through the neck 208 of the blade.

FIG. 14 shows a method of fabrication of a hockey blade (final blade not shown) being another embodiment of the invention, via a similar bladder molding process as is shown in FIG. 12. In this process, the bladder molding apparatuses 426 are oriented with respect to the additional pre-preg composite material element 438 and with respect to the mold (not shown) in such a way that the bladders 428 extend almost the complete longitudinal length of the central portion 444 blade to be formed, but not through the neck 408 of the blade to be formed. The U-shaped ends 430 of the bladders 428 remain within the central portion 444 of the blade to be formed, at the toe end. In this embodiment, however, the nozzles 432 extend from the heel end of the blade to be formed. Thus, as was the case with the embodiment in FIG. 12, after the hockey blade structure has been formed via this method and the bladders 428 have been removed, it will be required to seal the holes (albeit in the heel end) left after their removal. The final blade has cavities that extend almost the entire central portion 444 of the blade but not through the neck 408 of the blade.

In all of the above described embodiments, the cavities contain ambient pressure air in the final hockey stick blade.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method of fabricating a hockey stick blade having spaced apart rear and front face elements, the method comprising:
   providing at least two inflatable bladders;
   separately wrapping each of the inflatable bladders with at least one respective inner pre-preg composite element;
   placing the wrapped inflatable bladders side by side and aligned with one another;
   collectively wrapping the aligned wrapped inflatable bladders with an outer pre-preg composite element;
   placing the collectively wrapped inflatable bladders within a mold having a general form of a hockey stick blade;
   inflating the collectively wrapped inflatable bladders within the mold;
   heating the mold to cure the pre-preg composite elements to define the spaced apart rear and front face elements with the outer pre-preg composite element and to define a fiber-reinforced polymer structural member interconnecting the rear and front face elements with the inner pre-preg composite element compressed between each adjacent ones of the bladders;
   removing the cured hockey blade structure from the mold;
   deflating the inflatable bladders and removing at least a portion of the inflatable bladders from the cured hockey stick blade structure; and
   sealing openings in the hockey stick blade structure from which the inflatable bladders were removed, wherein sealing openings includes adding supplemental pre-preg composite material over each opening, inserting the hockey blade structure with the supplemental pre-preg composite material in an additional mold, and curing the supplemental pre-preg composite material.

2. The method of fabricating a hockey stick blade of claim 1, further comprising severing the inflatable bladders at a point outside of the hockey stick blade structure.

3. The method of fabricating a hockey stick blade of claim 1, wherein the individually wrapped inflatable bladders are placed side by side such that each individually wrapped inflatable bladder has two elongated portions extending side-by-side interconnected by a U-shaped end.

4. The method of fabricating a hockey stick blade of claim 1, further comprising, before placing the collectively wrapped inflatable bladders within the mold, placing at least one supplemental pre-preg composite element about the collectively wrapped inflatable bladders.

5. The method of fabricating a hockey stick blade of claim 1, wherein the general form of the hockey stick blade defined by the mold includes a blade portion and a neck portion, the collectively wrapped inflatable bladders being placed within the mold such that the bladders extend along a longitudinal length of the blade portion and curve to extend into the neck portion, each bladder being connected to a nozzle extending out of the neck portion.

6. The method of fabricating a hockey stick blade of claim 1, wherein the general form of the hockey stick blade defined by the mold includes a blade portion and a neck portion, the collectively wrapped inflatable bladders being placed within the mold such that the bladders extend along a longitudinal length of the blade portion without extending through the neck portion, each bladder being connected to a nozzle extending out of the blade portion in proximity of the neck portion.

7. The method of fabricating a hockey stick blade of claim 1, wherein the general form of the hockey stick blade defined by the mold includes a blade portion and a neck portion, the blade portion having a toe end opposite the neck portion, the collectively wrapped inflatable bladders being placed within the mold such that the bladders extend along a longitudinal length of the blade portion and curve to extend into the neck portion, each bladder being connected to a nozzle extending out of the toe end.

8. The method of fabricating a hockey stick blade of claim 1, wherein the general form of the hockey stick blade defined by the mold includes a blade portion and a neck portion, the blade portion having a toe end opposite the neck portion, the collectively wrapped inflatable bladders being placed within the mold such that the bladders extend along a longitudinal length of the blade portion without extending through the neck portion, each bladder being connected to a nozzle extending out of the toe end.

* * * * *